July 28, 1942.

W. McARTHUR 2,291,247

AIRPLANE SEAT

Filed Dec. 31, 1941

3 Sheets-Sheet 1

INVENTOR.
BY
ATTORNEY

July 28, 1942.  W. McARTHUR  2,291,247
AIRPLANE SEAT
Filed Dec. 31, 1941  3 Sheets-Sheet 2
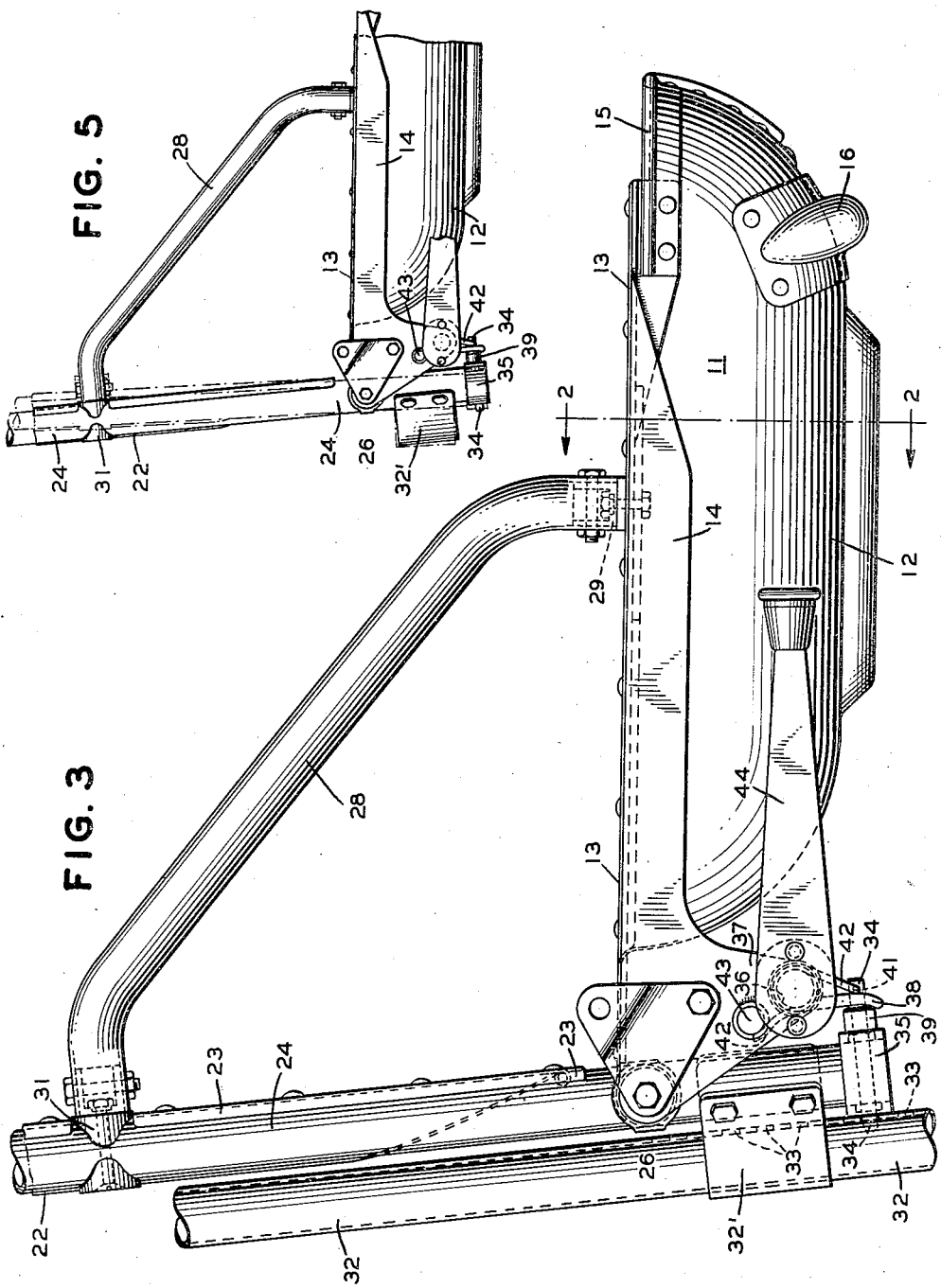

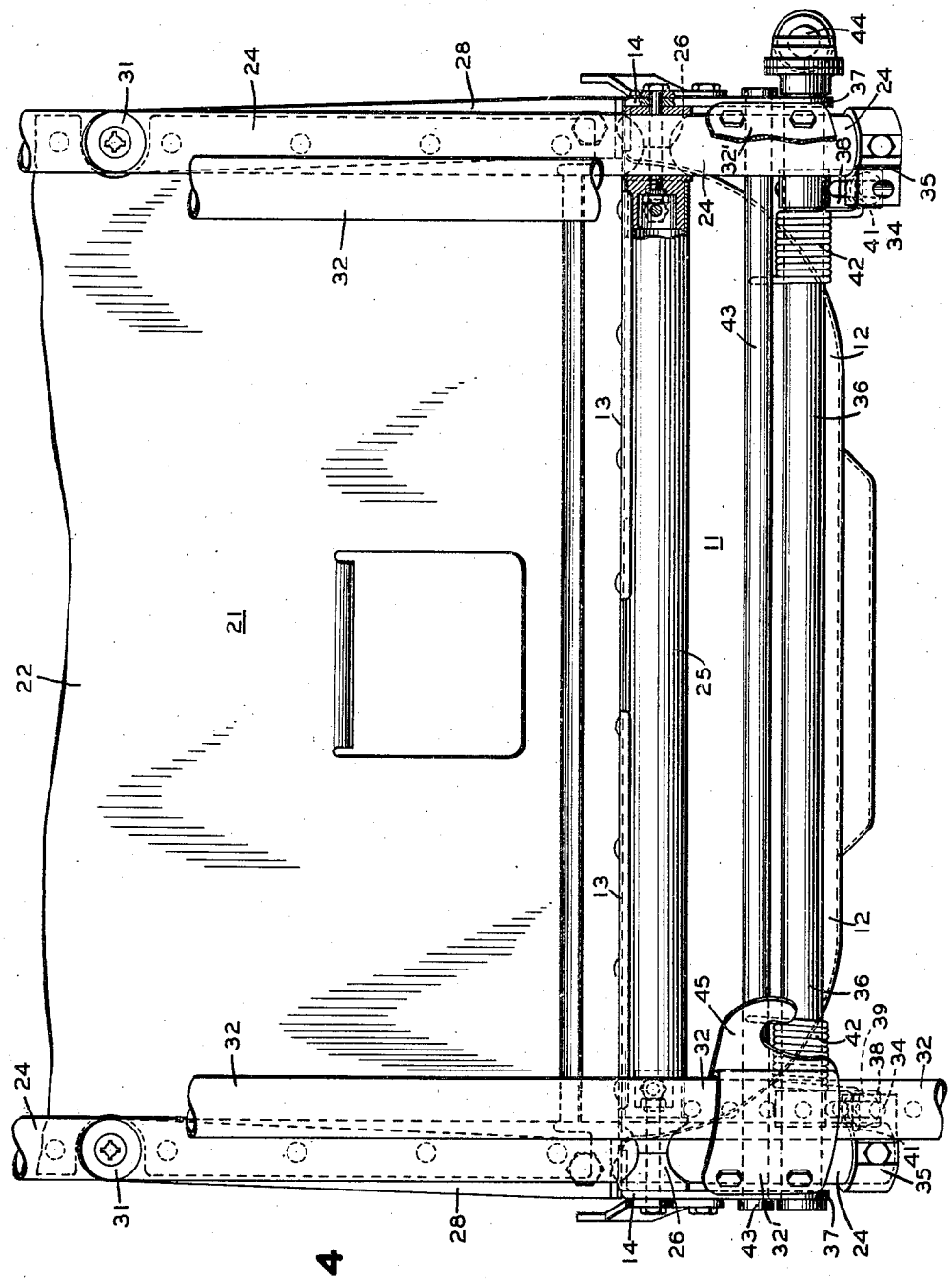

Patented July 28, 1942

2,291,247

UNITED STATES PATENT OFFICE 2,291,247

AIRPLANE SEAT

Warren McArthur, New York, N. Y., assignor to Warren McArthur Corporation, a corporation of New York Application December 31, 1941, Serial No. 425,040

4 Claims. (Cl. 155—5)

This invention relates to seats and more particularly to pilot seats for use in military and naval planes.

Heretofore, the so-called "bucket" seat has been generally used by military pilots. This seat consists of several sheet metal parts formed into the proper shape and secured together. The manufacture of such seats requires handwork on sheet metal, thus preventing quantity production and calling for a type of labor that is expensive and very scarce at the present time. Also, in order to provide sufficient strength in these seats, particularly at the top of the back to take the loads required by the shoulder harness now used by military and naval pilots, it is necessary to reinforce the bucket seat. This further increases both the cost and weight of the seat. At the same time, the construction is such that damage to any part of the seat requires the replacement of the entire assembly.

An object of this invention is to provide a pilot seat of lighter weight than the reinforced bucket seat, but having ample strength to resist all required loads.

A further object is to provide a light weight, sheet metal pilot seat constructed and arranged to permit quantity production by modern manufacturing methods.

A still further object is to provide a seat of the type set forth of such construction as to permit easier replacement of damaged parts, and one which is more adaptable to armor plate than the former type of seat.

Figure 1:
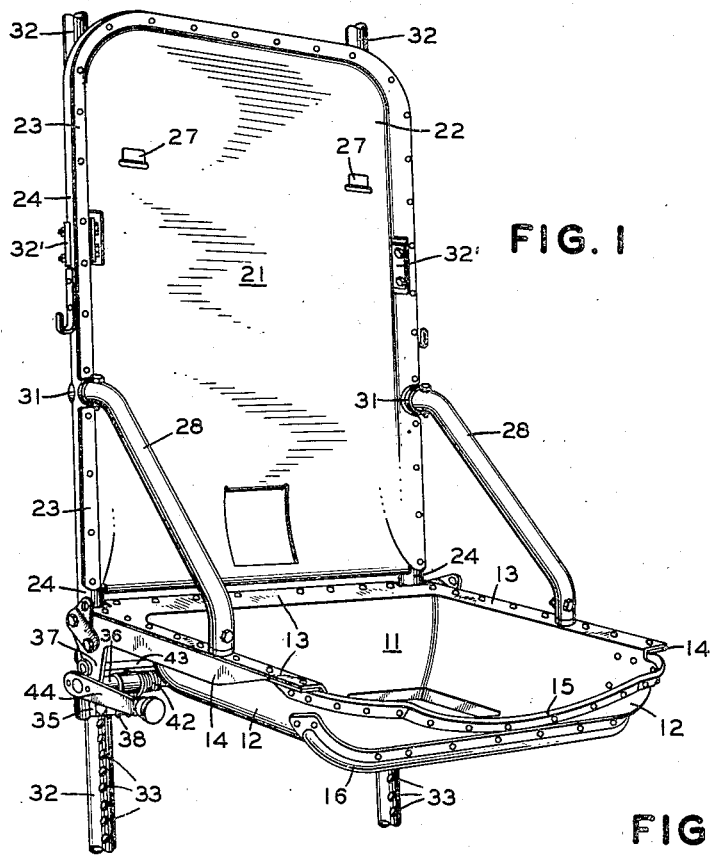
Figure 6:
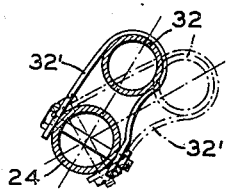
Figure 2:
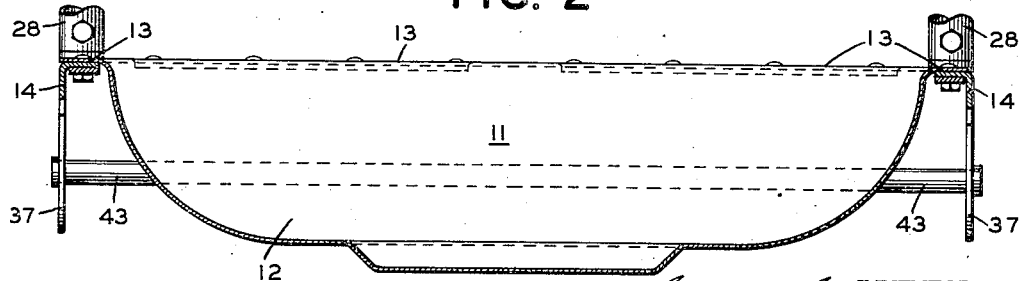

These and other objects which will be apparent to those skilled in this particular art are accomplished by the present invention, one embodiment of which is shown in the accompanying drawings, in which Fig. 1 is a perspective view of a pilot seat constructed in accordance with one embodiment of this invention, showing the same mounted for vertical movement on the usual supporting stanchions, Fig. 2 is a transverse section through the seat frame, Fig. 3 is a partial side elevation on an enlarged scale, Fig. 4 is a partial rear elevation, showing the manner of connecting the seat and back frames together, parts being broken away, Fig. 5 is a side elevation showing variations in the angle between the back and seat frames which are possible, and Fig. 6 is a section through the back frame.

The particular embodiment of this invention which has been chosen for illustration includes a seat frame 11 having a dish-shaped sheet metal seat pan 12 provided with an outwardly extending flange 13 formed along the opposite side edges and the rear edge thereof. Reinforcing seat frame members 14, illustrated in the form of angles, extend along each side and are riveted or otherwise secured to the flange 13 at each side. A reinforcing and finishing strip 15 is also secured to the front edge of the seat pan and to the front ends of the angle frame members 14. Also a pressed stiffening member 16 is preferably secured across the front curved bottom face of the seat pan.

A back frame 21 includes a sheet metal back 22 having a peripheral, outwardly extending concave flange 23 formed around the side and top edges thereof. A reinforcing tubular back frame member 24 of inverted U-shape surrounds the sides and top of the back pan and is riveted or otherwise secured to the flange 23.

The seat and back frames are secured together by a tubular connecting member 26, see Fig. 4, which is secured to the flange 13 along the rear edge of the seat pan. At each end the tubular connecting member is secured to the opposite arms of the U-shaped back frame member 24 by any suitable means, preferably by a joint fitting 26 such as that disclosed in my copending application Serial Number 417,247, filed October 31, 1941, and indicated in Figs. 3 and 4 in dotted lines. This cross member 25 provides for lateral stability of the seat under load. The back pan 22 is provided with a pair of slots 27 to accommodate clips which are provided on the back cushion (not shown) for holding the cushion in place.

The seat and back assemblies are also secured together by side braces or arms such, for example, as the light weight members 28, best shown in Figs. 1 and 3. Each arm is rigidly secured to the adjacent side flange 13 of the seat pan and angle member 14 by a joint fitting 29 such, for example, as that described in my said application and indicated in dotted lines in Figs. 2 and 3, and to the adjacent arm of the U-shaped back frame member 24 by a similar joint fitting 31.

In the present construction, where the seat and back frames are fastened together at a hinge point for relative angular adjustment, it is a simple matter to arrange the angle between the seat and back frames to adapt the construction for installation in any particular plane regardless of what the angle requirements are, and this can be done simply by lengthening or shortening the side braces or arms 28 illustrated.

The assembled seat and back frames are mounted for vertical movement on a pair of tubular stanchions 32 extending slidably through pairs of connecting brackets 32' secured to and spaced vertically on each arm of the U-shaped back frame member 24.

In different planes the center to center distance between the stanchions 32 often varies as a result of structural conditions. To meet this situation it is necessary to vary the center to center distance between the brackets 32' and this can be easily done simply by drilling the holes to which the brackets are secured in the tubular frame member 24 at such an angle as to space the brackets on the proper center to center distance. Obviously, varying the angle or the radius on which these holes are drilled will vary the spread between the brackets.

The stanchions have vertically spaced holes 33 in the faces thereof adapted to receive the ends of pins 34 slidably supported in collars 35 secured to the lower ends of the back frame member 24. A pin operating rod 36 is rotatably mounted at each end in brackets 37 formed by extensions of the seat side frame members 14, and forks 38 secured to the rod engage the pins between collars 39 and a hole 41 or the like in which is inserted the bent end of a coil spring 42 which surrounds the rod 36 and has its other end biased against a tie rod 43 which connects and braces the brackets 37, see Figs. 3 and 4. A pin operating lever 44 is secured to and extends forwardly from one end of the rod 36 to enable the pilot to retract the pins 34 from the stanchion holes 33 against the tension of the springs 42 to permit vertical adjustment of the seat assembly on the stanchions. When the lever is released the springs return the pins to the holes 33. A clip 45, see Fig. 4, is secured to each lower end of the U-shaped back frame member, only one being shown, to which may be connected the ends of an elastic cord or the like (not shown) which extends upwardly and is attached to the stanchion tubes, the airplane ceiling, or other convenient part. This device counteracts part of the weight of the pilot and seat so that when the pilot relieves the seat of his own weight and lifts the pin operating lever 44 to retract the pins from the stanchions the seat will move upward, or, if he retains his seat, it will move downward, adjustment in either direction being simple and instantaneous.

The present invention provides an extremely light weight, strong seat which can be inexpensively manufactured in quantity. The sheet metal seat and back pans are simple stampings. The tubular frame members can be easily and quickly shaped from standard tubing, and the two parts, namely, the seat and back frames permits separate manufacture of the two units which then meet in final assembly. Also, in case of damage, either unit can be replaced without losing the entire assembly as is now the case with the conventional sheet metal bucket seats.

This invention also provides a seat which, without additional reinforcement, such as required by the bucket seat, easily withstands the load of six hundred pounds horizontal forward pull imposed on it by the shoulder harness now standard with both the Army and Navy.

Obviously, the invention can be variously modified and adapted within the scope of the appended claims.

I claim:

1. A pilot seat construction comprising in combination, a dish-shaped sheet metal seat pan having an upper peripheral edge formed with an outwardly extending flange along the sides and back thereof, a frame member secured to each of said side flanges, a sheet metal back pan having a peripheral flange around the sides and top thereof, a U-shaped tubular frame member secured to the flange of said back pan and surrounding the sides and top thereof, means for securing said U-shaped frame member to the side frame members of said seat pan including a frame member connected to the flange of said seat pan along the back thereof.

2. A pilot seat construction comprising in combination, a dish-shaped sheet metal seat pan having an upper peripheral edge formed with an outwardly extending flange along the sides and back thereof, a frame member secured to each side flange, a sheet metal back pan having a peripheral flange around the sides and top thereof, a U-shaped tubular frame member secured to the flange of said back pan and surrounding the sides and top thereof, means for securing said U-shaped frame member to the side frame members of said seat pan including a tubular frame member connected to the flange of said seat pan along the back thereof, and means for securing said tubular frame member to the arms of said U-shaped frame member.

3. A pilot seat construction comprising in combination, a dish-shaped sheet metal seat pan having an upper peripheral edge formed with an outwardly extending flange along the sides and back thereof, a frame member secured to each of said side flanges, a sheet metal back pan having a peripheral flange around the sides and top thereof, a U-shaped tubular frame member secured to the flange of said back pan and surrounding the sides and top thereof, arm members connecting the side frame members of said seat to said U-shaped back frame member, means for securing said U-shaped back frame member to the side frame members of said seat pan including a frame member connected to the seat flange along the rear thereof, and means securing said frame member to the arms of said U-shaped frame member.

4. A pilot seat construction comprising in combination, a dish-shaped sheet metal pan having an upper peripheral edge formed with an outwardly extending flange along the sides and back thereof, a frame member secured to each of said side flanges, a sheet metal back pan having a peripheral flange around the sides and back thereof, a U-shaped frame member secured to the flange of said back pan and surrounding the sides and top thereof, means for securing said U-shaped member to the side frame members of said seat frame including a tubular frame member connected to the flange of said seat pan along the back thereof, means securing said tubular frame member to the arms of said U-shaped member, vertical stanchions, means for slidably connecting said stanchions to said back frame, and means for supporting the assembly on said stanchions at different vertical positions.

WARREN McARTHUR.